M. W. GROSSER.
FISH SCALING DEVICE.
APPLICATION FILED OCT. 15, 1907.

901,805.

Patented Oct. 20, 1908.

Witnesses
Frank Hough

Inventor
Max William Grosser,
By Victor J. Evans
Attorney

UNITED STATES PATENT OFFICE.

MAX WILLIAM GROSSER, OF CHICAGO, ILLINOIS.

FISH-SCALING DEVICE.

No. 901,805.  Specification of Letters Patent.  Patented Oct. 20, 1908.

Application filed October 15, 1907. Serial No. 397,521.

*To all whom it may concern:*

Be it known that I, MAX WILLIAM GROSSER, a citizen of the United States of America, residing at Chicago, in the county of Cook and State of Illinois, have invented new and useful Improvements in Fish-Scaling Devices, of which the following is a specification.

This invention relates to fish scaling devices and one of the principal objects of the same is to provide a device of simple construction which will quickly and thoroughly scale a fish.

Another object of the invention is to provide a tapered tubular scaling device having a roughened exterior said tubular device being secured to a handle provided with a ring for suspending the same.

These and other objects may be attained by means of the construction illustrated in the accompanying drawing, in which:—

Figure 1:
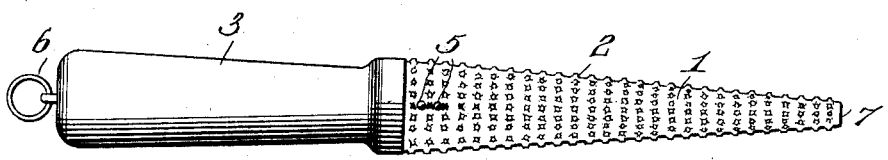
Figure 2:
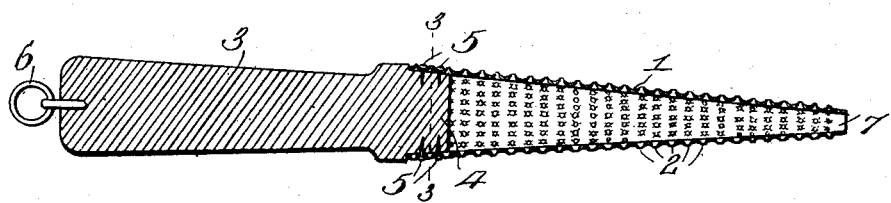
Figure 3:
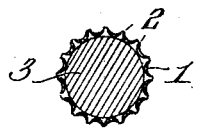

Figure 1 is a side elevation of a fish scaling device made in accordance with my invention. Fig. 2 is a central longitudinal section of the same. Fig. 3 is a transverse sectional view on the line 3—3 of Fig. 2.

Referring to the drawing for a more specific description of my invention, the numeral 1 designates the tapered tubular portion of the scaler which may be made of sheet metal of suitable gage or thickness and provided with holes punched from the inner side to form roughened burs 2 projecting from the outer surface. A suitable handle 3 provided with a reduced portion 4 is connected to the scaling tube 1 by means of tacks or other suitable fastenings 5. Secured to the outer end of the handle 3 is a supporting ring 6.

From the foregoing it will be obvious that owing to the taper of the scaler 1, the smaller end 7 can be used for scaling the difficult parts of the fish around the gills and that the scaler being of tubular form all sides of the same may be brought into use to quickly scale a fish.

My device is of simple construction, can be manufactured at slight cost and is efficient and reliable for its purpose.

Having thus described the invention, what is claimed as new, is:—

The herein described fish scaler comprising a tapered metallic tube provided with punched holes having roughened burs upon the outer side of the tube, and a handle having a reduced portion to which the upper end of the tube is secured.

In testimony whereof I affix my signature in presence of two witnesses.

MAX WILLIAM GROSSER.

Witnesses:
EDWARD BERNAU,
MATTHAUS KNAUBER.